United States Patent
Bonnet

(12) 
(10) Patent No.: US 6,247,576 B1
(45) Date of Patent: Jun. 19, 2001

(54) TILT TRAY CONVEYOR INCLUDING DUAL ACTION SINGLE BELLOWS

(75) Inventor: Henri Bonnet, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 09/467,555

(22) Filed: Dec. 20, 1999

(51) Int. Cl.[7] ............................................ B65G 47/46
(52) U.S. Cl. ................................................. 198/370.04
(58) Field of Search ..................................... 198/370.04

(56) References Cited

U.S. PATENT DOCUMENTS

| | | | | |
|---|---|---|---|---|
| 3,053,377 | * | 9/1962 | Strothmann | 198/370.04 |
| 4,787,498 | * | 11/1988 | Males et al. | 198/370.04 |
| 4,982,828 | * | 1/1991 | Nicolson et al. | 198/370.04 |
| 5,301,790 | * | 4/1994 | Prydtz et al. | 198/349 |
| 5,388,681 | | 2/1995 | Bonnet | 198/370.04 |
| 5,730,273 | * | 3/1998 | Boller | 198/370.04 |
| 5,746,301 | * | 5/1998 | Maier | 198/370.04 |
| 5,839,566 | * | 11/1998 | Bonnet | 198/370.04 |
| 5,857,555 | * | 1/1999 | Maier et al. | 198/370.04 |
| 5,894,918 | * | 4/1999 | Bonnet | 198/370.04 |
| 6,003,656 | * | 12/1999 | Fortenbery | 198/477.1 |
| 6,082,522 | * | 7/2000 | Polling | 198/370.04 |
| 6,095,314 | * | 8/2000 | Fortenbery | 198/360 |
| 6,135,262 | * | 10/2000 | Polling | 198/370.04 |
| 6,152,280 | * | 11/2000 | Bruun | 198/370.04 |

* cited by examiner

*Primary Examiner*—Christopher P. Ellis
*Assistant Examiner*—Rashmi Sharma
(74) *Attorney, Agent, or Firm*—Alston & Bird LLP

(57) ABSTRACT

A single "tilting" tray conveyor is provided which can be tilted to either side of a conveyor axis with the use of a single substantially linear force member lying substantially along the conveyor axis and two selectively detachable side latches which can also act as pivots when not detached. In one embodiment, the linear force member is an air-operated bellows, and the selective detachment is provided by the use of two electromagnets which correspond to two steel rods on either side of the tilting tray.

20 Claims, 5 Drawing Sheets

ROCKING

PIVOTING

DUAL BELLOWS 132

TILT TRAY CONVEYOR INCLUDING DUAL ACTION SINGLE BELLOWS

TECHNICAL FIELD

The present invention generally relates to conveyors, and particularly relates to an endless belt conveyor system which allows for selective discharge of packages or parcels thereon to either side of the conveying path, typically for use for sortation purposes.

BACKGROUND OF THE INVENTION

In facilities for the receiving and sorting of articles, particularly parcels, packages, and letter, conveyors of various types are provided as part of the sorting system. If an endless belt type conveyor is provided, there will frequently be provided various destinations or discharge stations for packages along each side of predetermined conveyor belt path. Each discharge station may correspond to a particular zip code, for example. Conventionally, sortation of packages is performed by manually removing packages from the belt and placing the packages onto discharge stations.

There are known side-discharge conveyor systems which use a track, formed into a closed loop to support and guide a series of connected carriages. A tiltable tray is conventionally mounted on such carriages for tipping to either side at sort locations. Such a system is disclosed, for example, in U.S. Pat. No. 4,982,828, to Nicolson, et al. However, such systems have a number of disadvantages. The initial cost of constructing the track for such a system is very high. In addition, such systems have numerous mechanical parts, which makes the systems prone to breakdowns as a result of wear on such mechanical parts. Such systems, unlike endless-belt conveyor systems, occupy floor space for a return track. As floor space is typically at a premium in sorting facilities, the need for additional space is a disadvantages of such a system.

There are also known side discharge assemblies which include a belt assembly for supporting a flexible belt, and a member provided for local lateral tilting of the belt assembly. Such a conveyor assembly is disclosed, for example, in U.S. Pat. No. 4,461,378 to Roth. Such a system, like the systems employing carriages on a closed loop, requires a substantial initial investment. In addition, such a system has a large number of moving parts, which are prone to breakdown as a result of mechanical wear.

U.S. Pat. No. 5,388,681 to Bonnet, entitled "Inflatable Conveyor Belt", issued Feb. 14, 1995, discloses a conveyor belt having a lowered surface and a number of articles supporting surfaces, each of which is tiltably attached to the lower surface. Inflatable chambers are defined in the belt, with the article supporting surfaces being disposed to tilt upon inflation of the inflatable members. An article conveyor system includes a belt having a lower surface and article supporting surfaces tiltably attached to the lower surface, a conveyor belt for supporting the belt during motion along a predetermined path, and an apparatus for selectably introducing pressurized air between the lower surface and each of the article supporting surfaces for tilting the article supporting surfaces, thereby causing an article on the selectively tilted article supporting surfaces to be discharged.

Although the above prior art may include advantages, improvements in the art are always needed.

SUMMARY OF THE INVENTION

The present invention provides improvements in the art by providing a single "tilting" tray conveyor which can be tilted to either side of the conveyor axis with the use of a single substantially linear force member lying substantially along the conveyor axis and two selectively detachable side latches which can also act as pivots when not detached. In one embodiment, the linear force member is an air-operated bellows, and the selective detachment is provided by the use of two electromagnets which correspond to two steel rods on either side of the tilting tray.

Therefore it is an object of the invention to provide an improved conveyor system.

It is a further object of the present invention to provide an improved conveyor system which is simple to manufacture.

It is a further object of the present invention to provide an improved conveyor system which is simple to operate.

It is a further object of the present invention to provide an improved conveyor system which is simple to maintain.

It is a further object of the present invention to provide an improved conveyor system which is cost-effective to manufacture.

It is a further object of the present invention to provide an improved conveyor system which is cost-effective to operate.

It is a further object of the present invention to provide an improved conveyor system which is cost-effective to maintain.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Reference is now made to the figures, in which like numerals indicate like elements throughout the several views.

The Conveyor Apparatus Generally

Generally described, the invention includes the use of a single "tilting" tray conveyor which can be tilted to either side of the conveyor axis with the use of a single substantially linear force member lying substantially along the conveyor axis and two selectively detachable side latches which can also act as pivots when not detached. In one embodiment, the linear force member is an air-operated bellows, and the selective detachment is provided by the use of two electromagnets which correspond to two steel rods on either side of the tilting tray.

Figure 1:
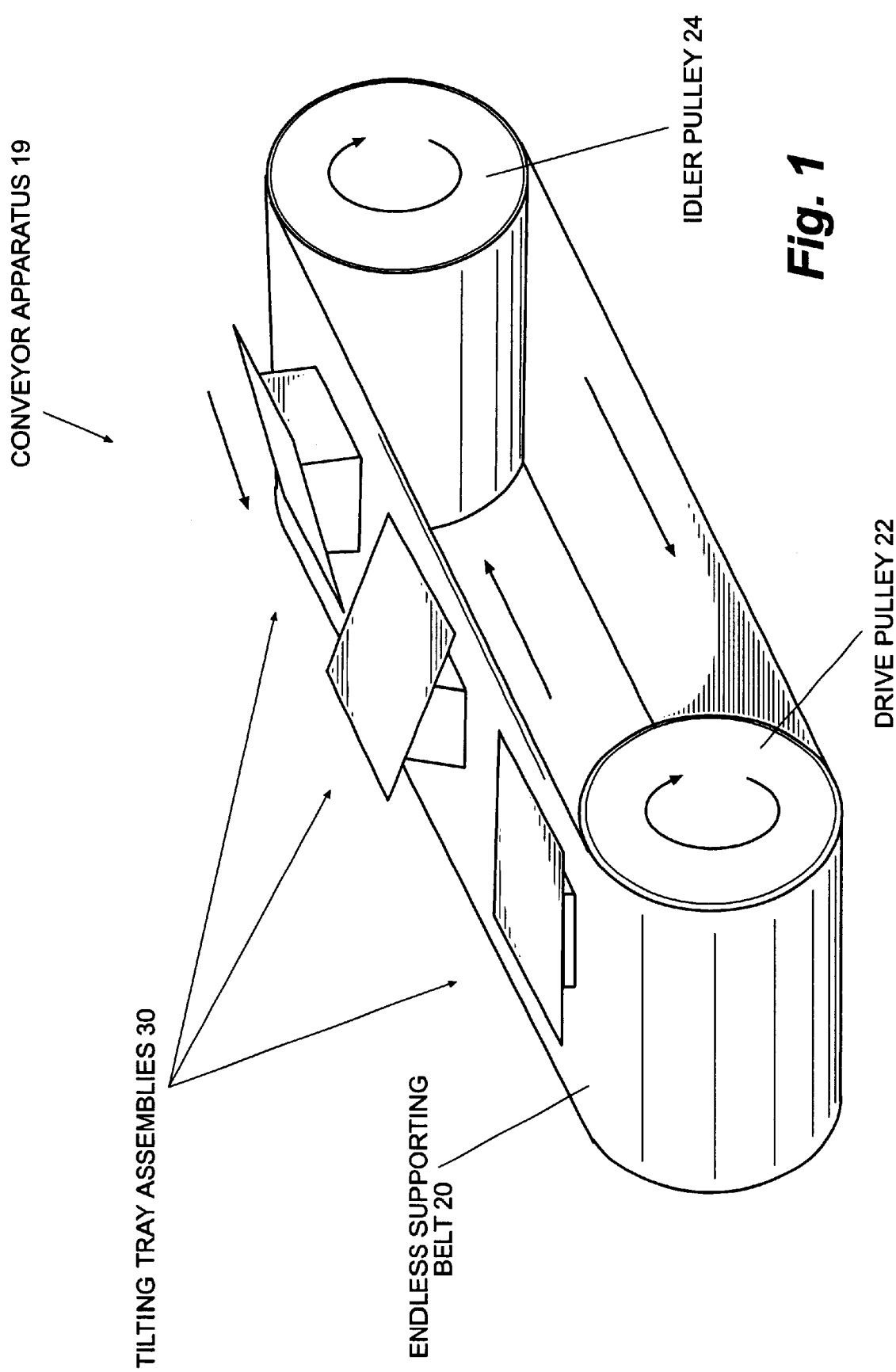
FIG. 1 is a pictorial view of a conveyor apparatus 10 according to the present invention, which generally includes an endless supporting belt 20 driven by a drive pulley 22 and an idler pulley 24. The endless supporting belt 20 supports a plurality of tilting tray assemblies 30 to provide selective discharge to either side of a relatively straight, elongate, conveying path.

Reference is first made to FIG. 1, which is a pictorial view of a conveyor apparatus 10 according to the present invention. Conveyor apparatus 10 generally includes an endless supporting belt 20 driven by a drive pulley 22 and an idler pulley 24. The endless supporting belt 20 supports a plurality of tilting tray assemblies 30 to provide selective discharge to either side of a relatively straight, elongate, conveying path. The belt 28 can be of polyester as known in the art.

Figure 2A:
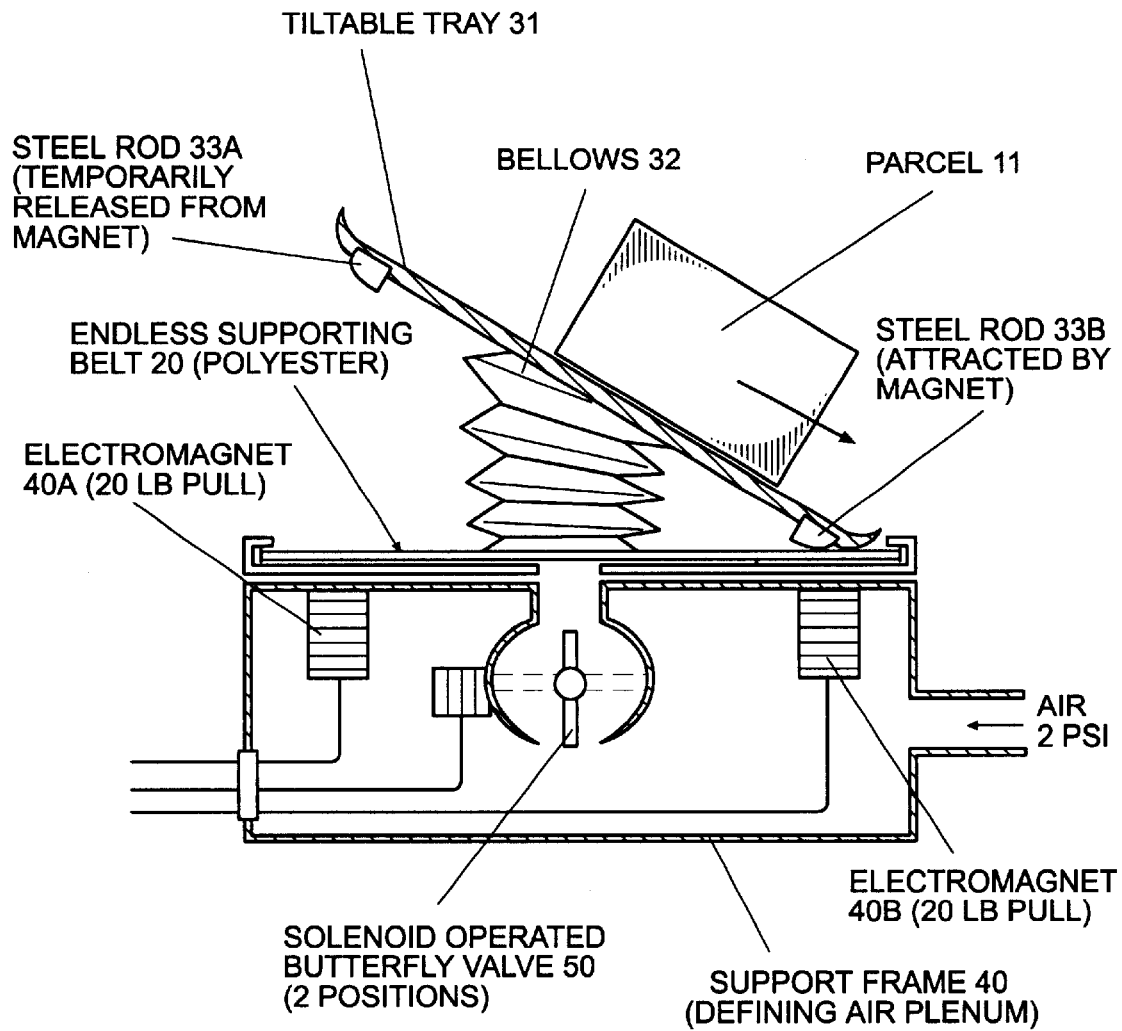
FIGS. 2A and 2B are illustrative, cross-sectional side elevational views of the conveying apparatus of FIG. 1, with FIG. 2A showing a parcel 11 being discharged to the viewer's right, and FIG. 2B showing a parcel being discharged to a viewer's left.
Figure 2B:
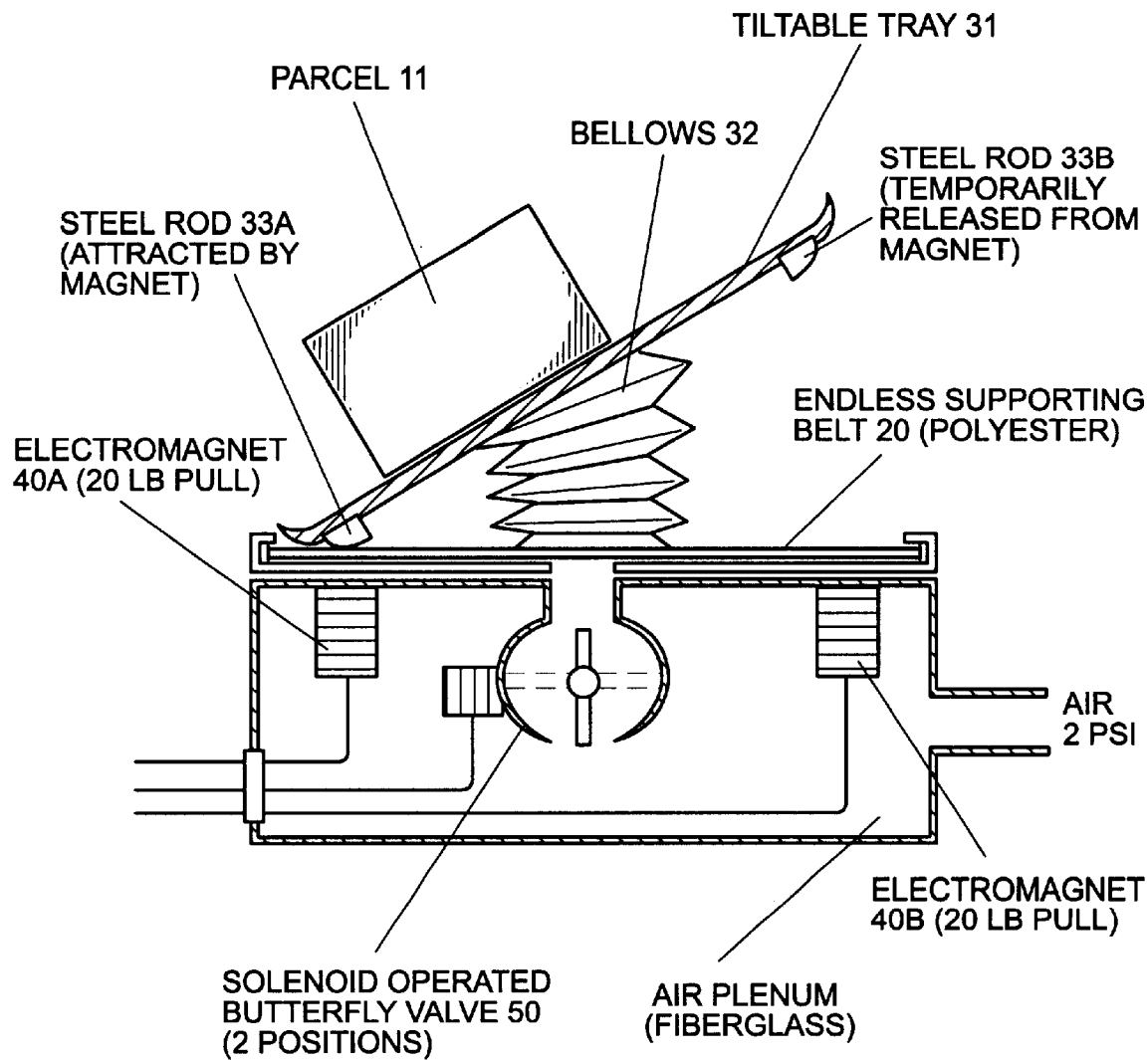
Figure 3:
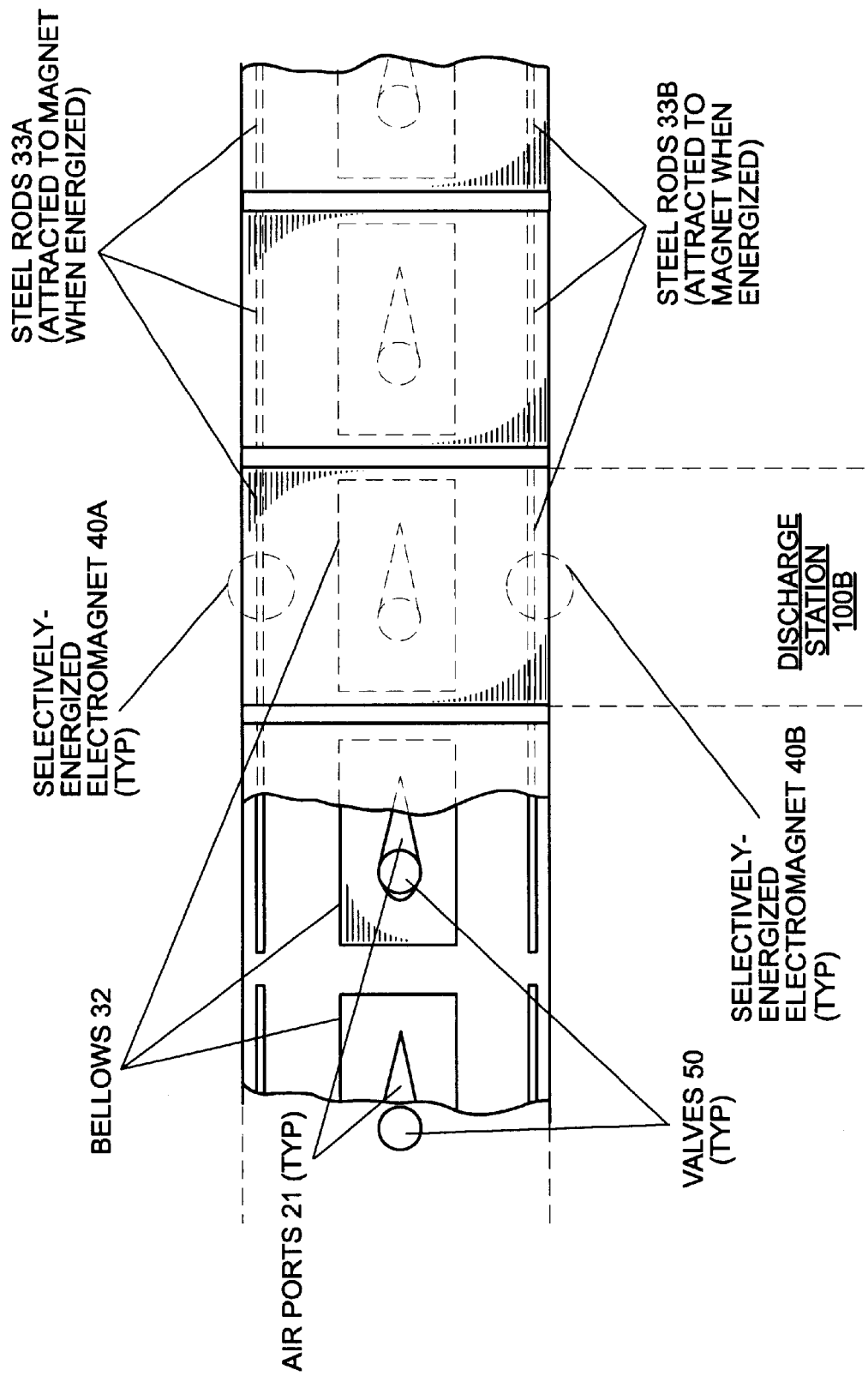
FIG. 3 is top plan view of a section of the conveyor apparatus 10 according to the present invention, showing the relationship of the bellows 32, the air ports 21, the steel rods 33A, 33B, and the electromagnets 40A, 40B.
Figure 4:
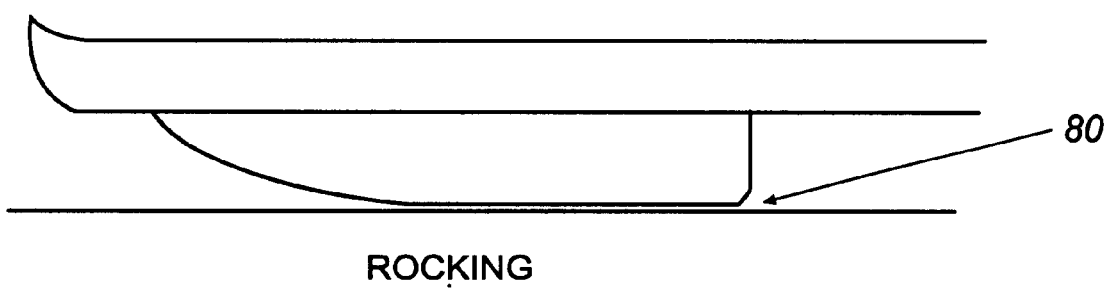
FIG. 4 is an isolated view of a "rocking"-type selective tilting connection 80 between one of said parallel steel rods 33A, 33B and said endless supporting belt 20.

The drive pulley 22 and idler pulley 24 are conventional and as known in the art, and are rotatably supported by a typical reference frame member 40 shown in FIGS. 2A and 2B.

The Tilting Tray Assembly

Referring now particularly to FIGS. 2A, 2b, and each tilting tray assembly 30 includes but is not limited to the following elements:

tiltable tray 31
bellows 32
steel rod 33A
steel rod 33B

The Tiltable Tray

The tiltable tray 31 includes a smooth upper surface 31S such as known in the art, to allow items to slide therefrom to either side of the conveying path.

The tiltable tray 31 includes a pair of elongate, substantially parallel steel rods 33A, 33B, which are, as shown in FIG. 2, positioned on either side of the traffic path.

The parallel steel rods can be integrally molded into the tray or can be attached by suitable fasteners.

The lower surface of the parallel steel rods 33A, 33B, is curved as shown to allow for some "rocking" as desired.

The tiltable tray 31 can be made of plastic as known in the art, or made of other materials including metals.

The Bellows

The bellows 32 has its upper end attached to the underside of the middle or "medial" portion of the tiltable tray 31, and its lower end attached to the endless supporting belt. Air is supplied into the lower end of the bellows 32 through a corresponding air port 21 in the endless supporting belt 20. The bellows 32 construction is as known in the art, although its application is not.

It should be understood that the bellows 32 is but one type of linear force member which could be used. Other configurations such as closed pneumatic cylinders, hydraulic cylinders or other hydraulic means, electric solenoids, or other linear force means such as known in the art are contemplated.

The Electromagnets

The electromagnets 40A, 40B are configured to selectively attract the parallel steel rods 33A, 33B, with for example, a 20 pound force. The electromagnet 40A is configured to selectively attract parallel steel rod 33A, and the electromagnet 40B configured to selectively attract parallel steel rod 33B. The electromagnets may be as known in the art.

The Valve

A solenoid operated butterfly valve 50 or other suitably operated valve is used as known in the art to selectively provide air to the bellows 32.

The Detachable Tilting Connections

Figure 5:
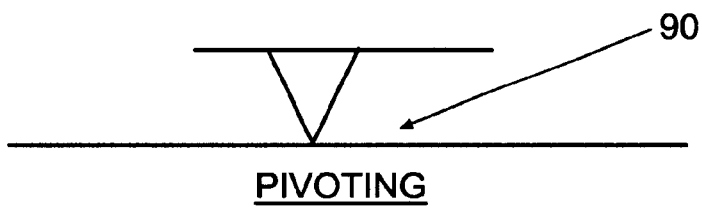
FIG. 5 is an isolated view of a "pivoting"-type selective tilting connection 90 between one of said parallel steel rods 33A, 33B and said endless supporting belt 20.

As may be understood, the electromagnets provide a detachable tilting connection between the tilting tray 31 and the conveyor base portion, being part of the endless belt 20. This detachable tilting connection may be a "rocking"-type selective tilting connection 80 between one of the parallel steel rods 33A, 33B and the endless supporting belt 20, or may be a "pivoting"-type selective tilting connection 90 between one of said parallel steel rods 33A, 33B and said endless supporting belt 20 as shown in FIG. 5.

Operation

Reference is first made to FIG. 2A. As may be seen, a parcel is atop the tiltable tray 31. The plastic tray 31 includes a pair of elongate, substantially parallel steel rods 33A, 33B, which are, as shown in FIG. 2, positioned on either side of the traffic path. Air at conventionally low pressure (e.g. 2 psi) is held as known in the air within a plenum defined by the reference frame 40. By selectably energizing electromagnets positioned underneath the conveyor path, and by selectively activates the butterfly valve 50 as the plastic tray may be tilted to the left (see FIG. 1A), when the air bellows is energized, causing the parcel to slide and to be ejected to the left.

Alternately, as shown in FIG. 2B, ejection to the other (right as viewed in the drawings) side of the conveyor path may be provided by deactivating the electromagnet on the left, while energizing the electromagnet on the right while the bellows member is energized with air.

Options and Alternatives

Figure 6:
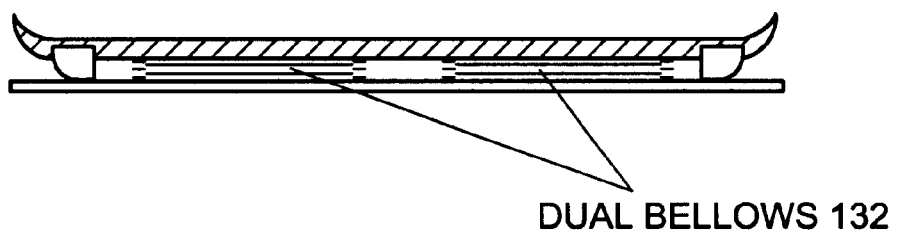
FIG. 6 is an illustrative view of an alternate apparatus which includes two bellows 132 intermediate the two detachable edge connections.

As may be understood, the present invention contemplates many different embodiments. FIG. 6 is an illustrative view of an alternate apparatus which includes two bellows 132 intermediate the two detachable edge connections.

It should also be understood that the present invention contemplates the use of nonmagnetic, purely mechanical detachable tilting connections, such as the use of selective friction gripping of flexible members, the selective introduction of sidewardly-moving engagement members, or other configurations which allow for detachment and tilting. The invention also contemplates the use of other linear force actuators besides the air-energized bellows 32, including but not limited to pneumatic or hydraulic cylinders.

CONCLUSION

Therefore it may be seen that the present invention provides improvements over the prior art by providing a single "tilting" tray which can be tilted to either side with the use of a single substantially linear force member and two selectively detachable side latches which can also act as pivot points when not detached. In one embodiment, the linear force member is an air-operated bellows, and the selective detachment is provided by the use of two electromagnets which correspond to two steel rods on either side of the tilting tray.

While this invention has been described in specific detail with reference to the disclosed embodiments, it will be understood that many variations and modifications may be effected within the spirit and scope of the invention as described in the appended claims.

What is claimed is:

1. A conveying system for conveying items along a conveying path and for selectively transversely discharging said items in substantially opposite directions to either of two opposing sides of said conveying path, said conveying system supported by a stationary frame and comprising:

a conveyor base portion moving substantially parallel to said conveying path relative to said frame;

a tiltable tray member defining an upwardly-directed supporting surface, said tiltable tray member including a medial portion and also including opposing first and second edge portions positioned proximate said opposing sides of said conveying path;

a first selectively detachable tiltable connection between said first edge portion of said tiltable tray member and said conveyor base portion; and a second selectively detachable tiltable connection between said second edge portion of said tiltable tray member and said conveyor base portion; and a selectively operable force member for selectively urging said medial portion of said tray member upwardly relative to said base portion while one but not the other of said first and second tiltable connections is tiltably connected to said base portion, such that an item positioned atop said tiltable tray member may be discharged by said force member over said tiltably connected one of said first and second tray edge portions.

2. The conveying system as claimed in claim 1, wherein said first and second selectively detachable tiltable connections are rocking connections.

3. The conveying system as claimed in claim 1, wherein said first and second selectively detachable tiltable connections are pivoting connections.

4. A conveying system for conveying items along a conveying path and for selectively transversely discharging said items in substantially opposite directions to either of two opposing sides of said conveying path, said conveying system supported by a stationary frame and comprising:

a conveyor base portion moving substantially parallel to said conveying path relative to said frame;

a tiltable tray member defining an upwardly-directed supporting surface, said tiltable tray member including a medial portion and also including opposing first and second edge portions positioned proximate said opposing sides of said conveying path;

a first selectively detachable tiltable connection between said first edge portion of said tiltable tray member and said conveyor base portion;

a second selectively detachable tiltable connection between said second edge portion of said tiltable tray member and said conveyor base portion; and a selectively operable air-energized bellows member for selectively urging said medial portion of said tray member upwardly relative to said base portion while one but not the other of said first and second tiltable connections is tiltably connected to said base portion, such that an item positioned atop said tiltable tray member may be discharged by said force member over said tiltably connected one of said first and second tray edge portions.

5. The conveying system as claimed in claim 4, wherein said first and second selectively detachable tiltable connections are rocking connections.

6. The conveying system as claimed in claim 4, wherein said first and second selectively detachable tiltable connections are pivoting connections.

7. A conveying system for conveying items along a conveying path and for selectively transversely discharging said items in substantially opposite directions to either of two opposing sides of said conveying path, said conveying system supported by a stationary frame and comprising:

a conveyor base portion moving substantially parallel to said conveying path relative to said frame;

a tiltable tray member defining an upwardly-directed supporting surface, said tiltable tray member including a medial portion and also including opposing first and second edge portions positioned proximate said opposing sides of said conveying path;

a first selectively magnetized detachable tiltable connection between said first edge portion of said tiltable tray member and said conveyor base portion;

a second selectively magnetized detachable tiltable connection between said second edge portion of said tiltable tray member and said conveyor base portion; and a selectively operable force member for selectively urging said medial portion of said tray member upwardly relative to said base portion while one but not the other of said first and second tiltable connections is tiltably connected to said base portion, such that an item positioned atop said tiltable tray member may be discharged by said force member over said tiltably connected one of said first and second tray edge portions.

8. The conveying system as claimed in claim 7, wherein said first and second selectively detachable tiltable connections are rocking connections.

9. The conveying system as claimed in claim 7, wherein said first and second selectively detachable tiltable connections are pivoting connections.

10. A conveying system for conveying items along a conveying path and for selectively transversely discharging said items in substantially opposite directions to either of two opposing sides of said conveying path, said conveying system supported by a stationary frame and comprising:

a conveyor base portion moving substantially parallel to said conveying path relative to said frame;

a tiltable tray member defining an upwardly-directed supporting surface, said tiltable tray member including a medial portion and also including opposing first and second edge portions positioned proximate said opposing sides of said conveying path;

a first selectively magnetized detachable tiltable connection between said first edge portion of said tiltable tray member and said conveyor base portion;

a second selectively magnetized detachable tiltable connection between said second edge portion of said tiltable tray member and said conveyor base portion; and a selectively operable air-energized bellows member for selectively urging said medial portion of said tray member upwardly relative to said base portion while one but not the other of said first and second tiltable connections is tiltably connected to said base portion, such that an item positioned atop said tiltable tray member may be discharged by said force member over said tiltably connected one of said first and second tray edge portions.

11. The conveying system as claimed in claim 10, wherein said first and second selectively detachable tiltable connections are rocking connections.

12. The conveying system as claimed in claim 10, wherein said first and second selectively detachable tiltable connections are pivoting connections.

13. A conveying system for conveying items along a conveying path and for selectively discharging said items to either side of the conveying path, said conveying system supported by a stationary frame and comprising:

- a conveyor base portion moving along the conveying path relative to said frame;
- a tiltable tray defining an upwardly-directed supporting surface, said tiltable tray including a middle portion and two side edges;
- a first selectively detachable tiltable connection between said first edge of said tray and said conveyor base portion;
- a second selectively detachable tiltable connection between said second edge of said tray member and said conveyor base portion; and
- a selectively operable force member for selectively urging said middle portion of said tray upwardly relative to said base portion while one but not the other of the two tray edges is tiltably connected to said base portion,
- such that by having only one of the two tray edges tiltably attached to the base, an item resting on the tray can be discharged over the attached edge by energizing the force member and allowing the tray to tilt to the side having the tiltable attachment.

14. The conveying system as claimed in claim 13, wherein said force member is an air-energized bellows.

15. The conveying system as claimed in claim 13, wherein said tiltable connections are facilitated by selectively activated magnetic attractions.

16. The conveying system as claimed in claim 13, wherein said first and second selectively detachable tiltable connections are rocking connections.

17. The conveying system as claimed in claim 13, wherein said first and second selectively detachable tiltable connections are pivoting connections.

18. The conveying system as claimed in claim 14, wherein said first and second selectively detachable tiltable connections are pivoting connections.

19. The conveying system as claimed in claim 15, wherein said first and second selectively detachable tiltable connections are pivoting connections.

20. A method for conveying items down a conveying path and for selectively discharging said items to either side of said conveying path, said method comprising the steps of:

- providing a conveyor base portion moving substantially along said conveying path;
- providing a tiltable tray member defining an upwardly-directed supporting surface and also including a medial portion and opposing first and second edges;
- providing a first selectively detachable tiltable connection between said first edge of said tiltable tray member and said base portion;
- providing a second selectively detachable tiltable connection between said second edge of said tiltable tray member and said base portion;
- providing a selectively operable force member for selectively urging said medial portion of said tray member upwardly relative to said base portion while one of said first and second tiltable connections is connected;
- positioning a first item atop said tiltable tray member;
- energizing said force member over one of said first and second tray edges while said first selectively detachable tiltable connection but not said second selectively detachable tiltable connection is attached;
- positioning a second item atop said tiltable tray member; and
- energizing said force member over the other of said first and second tray edges while said second selectively detachable tiltable connection but not said first selectively detachable tiltable connection is attached.

* * * * *

UNITED STATES PATENT AND TRADEMARK OFFICE
CERTIFICATE OF CORRECTION

PATENT NO.   : 6,247,576 B1
DATED        : June 19, 2001
INVENTOR(S)  : Bonnet

Page 1 of 1

It is certified that error appears in the above-identified patent and that said Letters Patent is hereby corrected as shown below:

<u>Column 5,</u>
Line 57, "said force member" should be replaced by -- said air-energized bellows member --

<u>Column 6,</u>
Line 59, "said force member" should be replaced by -- said air-energized bellows member --

Signed and Sealed this

Sixth Day of July, 2004

JON W. DUDAS
*Acting Director of the United States Patent and Trademark Office*